United States Patent [19]

Sato et al.

[11] Patent Number: 5,428,483
[45] Date of Patent: Jun. 27, 1995

[54] REFLECTING MIRROR

[75] Inventors: Kunihiko Sato; Kazuo Morohashi; Hidetoshi Takagi, all of Yokohama, Japan

[73] Assignee: Nippon Oil Co., Ltd., Tokyo, Japan

[21] Appl. No.: 868,484

[22] Filed: Apr. 14, 1992

[30] Foreign Application Priority Data

Apr. 19, 1991 [JP] Japan .................. 3-113861

[51] Int. Cl.⁶ .............................................. G02B 7/18
[52] U.S. Cl. ............................... 359/838; 359/848; 359/871; 359/883
[58] Field of Search ............... 359/838, 846, 847, 848, 359/871, 883

[56] References Cited

U.S. PATENT DOCUMENTS

| | | | |
|---|---|---|---|
| 4,198,452 | 4/1980 | Olcott et al. | 359/883 |
| 4,256,378 | 3/1981 | Prewo et al. | 359/848 |
| 4,875,766 | 10/1989 | Shimodaira et al. | 359/883 |
| 5,191,486 | 3/1993 | Sato et al. | 359/894 |

FOREIGN PATENT DOCUMENTS

| | | | |
|---|---|---|---|
| 2908394 | 9/1980 | Germany | 359/883 |
| 0031753 | 3/1977 | Japan | 359/883 |
| 1034106 | 6/1966 | United Kingdom | 359/883 |
| 1231234 | 5/1971 | United Kingdom | 359/883 |

*Primary Examiner*—Ricky D. Shafer
*Attorney, Agent, or Firm*—Bucknam and Archer

[57] ABSTRACT

This invention is to provide a lightweight, inexpensive reflecting mirror. A reflecting layer is formed on the front surface of a carbon fiber-reinforced plastic substrate. An reflecting mirror includes a first substrate consisting of a carbon fiber-reinforced plastics, a reflecting layer formed on the front surface of the first substrate, a second substrate formed on the rear surface of the first substrate, an edge member formed at edges of the first and second substrates, and a foamed body filled in a space defined by the first and second substrates and the edge member. The second substrate and the edge member preferably consist of a carbon fiber-reinforced plastics.

5 Claims, 3 Drawing Sheets

REFLECTING MIRROR

BACKGROUND OF THE INVENTION

1. Field of the Invention

The present invention relates to a reflecting mirror which is suitable for use as, e.g., a main mirror of a reflecting telescope.

2. Prior Art

Most of conventional concave mirrors for use as, e.g., main mirrors of reflecting telescopes are made of glass.

However, glass raises a problem as to its heavy weight. In addition, when a reflecting telescope is to be mounted on an equatorial telescope, a heavy balancer must be mounted to balance the overall system. Glass material used for a high-precision reflecting mirror is expensive.

SUMMARY OF THE INVENTION

The present invention has been made in consideration of the conventional disadvantages described above, and has as its object to provide a lightweight, inexpensive reflecting mirror.

The above object is achieved by providing specific reflecting mirrors of the present invention.

In one aspect of the present invention, the reflecting mirror comprises a substrate consisting of a carbon fiber-reinforced plastics and a reflecting layer formed on the surface of the substrate.

In another aspect of the present invention, the reflecting mirror comprises a first substrate consisting of a carbon fiber-reinforced plastics, a reflecting layer formed on the front surface of the first substrate, a second substrate formed on the rear surface of the first substrate, an edge member formed between the edge of the first substrate and the surface or edge of the second substrate, and a foamed body filled in a space defined by the first and second substrates and the edge member. The second substrate and the edge member preferably consist of a carbon fiber-reinforced plastics.

Function

The carbon fiber-reinforced plastic substrate can be machined like glass to allow a reflecting layer to be formed thereon. Since the reflecting layer is formed on the front surface of the carbon fiber-reinforced plastic substrate, the overall of the reflecting mirror obtained is very light.

DESCRIPTION OF THE PREFERRED EMBODIMENT

A preferred embodiment of the present invention will be described below with reference to the accompanying drawings.

Figures 1A, 1B:
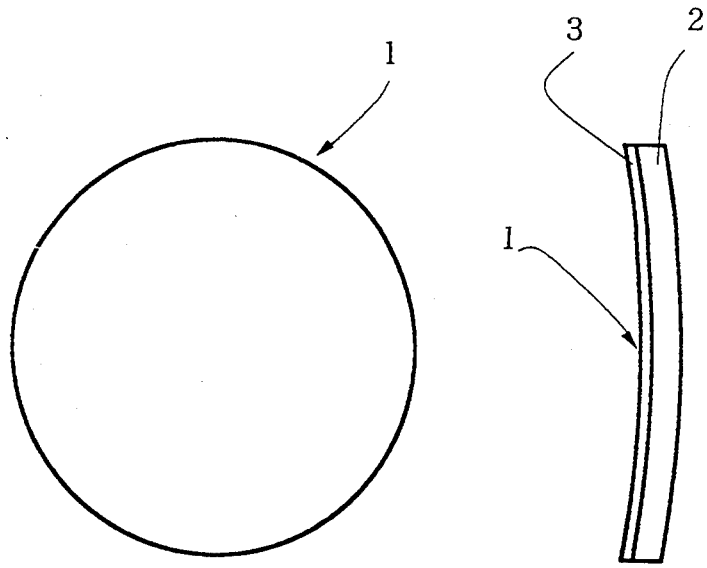
FIGS. 1(a) and 1(b) are a plan view and a sectional view, respectively, showing a concave mirror serving as a reflecting mirror according to an embodiment of the present invention.

FIG. 1(a) is a plan view of a concave mirror serving as a reflecting mirror according to an embodiment of the present invention, and FIG. 1(b) is a sectional view thereof. Referring to FIGS. 1(a) and 1(b), a concave mirror 1 comprises a substrate 2 and a reflecting layer 3 formed on the front surface of the substrate 2. The substrate 2 is made of a carbon fiber-reinforced plastics (CFRP). The CFRP used is obtained by hardening carbon fibers as a main component with an epoxy resin. The reflecting layer 3 comprises a metal plating layer made of aluminum, silver or the like. For illustrative convenience, the thickness of the reflecting layer 3 in FIG. 1(b) is exaggerated.

Figure 2:
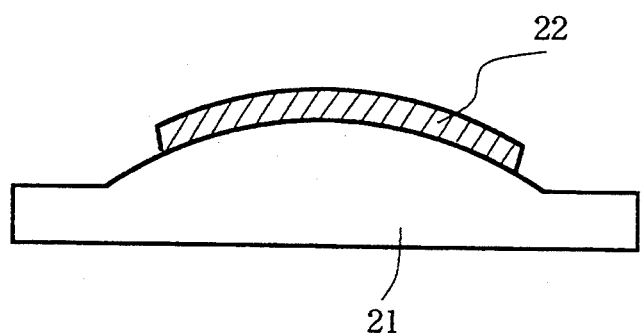
FIG. 2 is a sectional view showing a state wherein prepregs are stacked on a mold.

The concave mirror 1 is manufactured, for example, as follows. As shown in FIG. 2, several prepregs 22 are stacked one upon another to form a multilayered structure on a mold 21. The prepregs are each formed by impregnating carbon fibers aligned in uni-direction with an epoxy resin.

One of the prepregs is placed as a first layer on the mold 21. Assuming that the direction of carbon fibers of the first prepreg layer is 0°, subsequent prepregs are stacked as a second, third and fourth layer on the First layer in such a manner that the directions of carbon fibers of the second fourth layers are 90°, +45° and −45° respectively with respect to that (0°) of the first layer. Further subsequent prepregs are further stacked in such a manner that the directions of carbon fibers of the further subsequent prepregs are −45°, +45°, 90° and 0° respectively with respect to that (0°) of the first layer.

In the above manner, the prepregs are symmetrically stacked to obtain a pseudo-isotropic CFRP substrate, thereby preventing its warping when cured.

The mold 21 on which the prepregs 22 are so stacked is then placed and sealed in a nylon film bag, and the bag is evacuated by a vacuum pump. While evacuation using the vacuum pump is performed, the nylon bag is compressed and heated in an autoclave to cure the resin of the prepregs 22. The substrate 2 almost free from defects such as voids can thus be obtained. A pipe is bonded to the rear central portion of the substrate 2, and an unnecessary peripheral portion is lathed. The front surface of the substrate 2 is polished and specularly finished in the same manner as a conventional glass substrate to obtain a desired concave surface on which aluminum vapor deposition or the like is then effected to form a reflecting layer, thereby obtaining the concave mirror 1 shown in FIGS. 1(a) and 1(b).

The reflecting mirror of the above embodiment is one which is obtained by polishing a pseudo-isotropic CFRP substrate and then vepor depositing aluminum on the polished surface. Therefore, as compared with a conventional reflecting mirror obtained using glass and having an aperture almost equal to that of the reflecting mirror embodying the present invention, the latter is very lightweight. For example, although a glass reflecting mirror having an aperture of about 25 cm has a weight of about 3.3 kg, the reflecting mirror having the same aperture as described above according to this embodiment has a weight of about 0.3 kg.

In the method of manufacturing the above concave mirror, the mold is not limited to a metal mold, but it may be a CFRP mold. In addition, each prepreg used in this embodiment need not contain carbon fibers aligned in uni-direction, but can be a fabric prepreg. In addition, the stacking order of the prepregs and the number of prepregs stacked on each other may be arbitrarily changed.

The types of reinforcing fibers and matrix of prepregs used in the CFRP substrate are not limited to specific ones. However, since a matrix has a positive thermal expansion coefficient regardless of a thermo-plastic or thermo-setting matrix, the reinforcing fibers preferably have a negative thermal expansion coefficient. By using such a matrix and such reinforcing fibers, a total thermal expansion coefficient of the resultant CFRP substrate can become almost zero. For this reason, a reflecting mirror which is rarely adversely affected by changes in temperature can be obtained. An example of the reinforcing fiber having a negative thermal expansion coefficient is a petroleum pitch-based carbon fiber having a modulus in tension of 40 ton·f/mm² or more. For example, "Pyrex" available from Corning Glass Works and used for a conventional reflecting mirror in practice had a linear thermal expansion coefficient $\alpha = 3.25 \times 10^{-6}$, and "E·6" glass available from Ohara Optical Glass Seisakusho had a linear thermal expansion coefficient $\alpha = 2.4 \times 10^{-6}$. To the contrary, the reflecting mirror of this embodiment has a linear expansion coefficient $a$ of as small as about $-0.3 \times 10^{-6}$.

The CFRP substrate is low in (stress-) strain caused by its own weight. When, for example, the modulus of elasticity of CFRPs is compared with that of glass, glass exhibits a modulus of elasticity of about 7 ton·f/mm², while a CFRP using carbon fibers "XN-40" (modulus in tension: 40 ton f/mm²) available from NIPPON OIL CO., LTD. exhibits a modulus of elasticity of 8.6 ton·f/mm², a CFRP using carbon fibers "XN-50" (modulus in tension: 50 ton·f/mm²) exhibits a modulus of elasticity of 9.6 ton·f/mm², and a CFRP using carbon fibers "XN-70" (modulus in tension: 70 ton f/mm²) exhibits a modulus of elasticity of 14.3 ton·f/mm².

Figure 3:
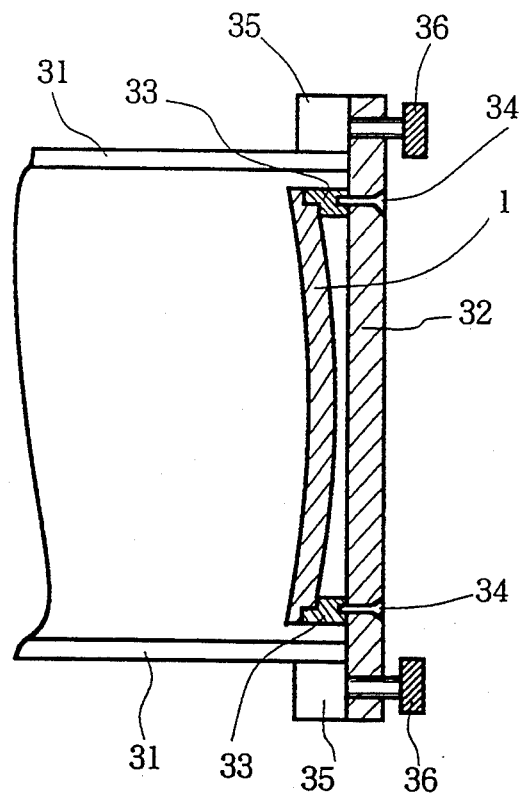
FIG. 3 is a sectional view showing a state wherein the concave mirror in FIG. 1 is mounted as a main mirror of a reflecting telescope.

FIG. 3 is a sectional view showing a state wherein the concave mirror 1 is mounted as a main mirror of a reflecting telescope. Reference numeral 31 denotes a mirror barrel of the reflecting telescope; 32, an CFRP-made main mirror cell; and 33, CFRP-made mounting members formed around the concave mirror 1. The mounting members 33 are bonded and fixed with an adhesive at several peripheral positions of the concave mirror 1 so that the mounting members 33 protrude from the rear surface of the concave mirror 33. The mounting members 33 are fixed on the main mirror cell 32 by screws 34, thereby mounting the concave mirror 1 on the main mirror cell 32. The mounting member 33 may be an annular member, and it may be bonded and fixed to the entire periphery of the concave mirror 1. Reference numeral 35 denotes an reinforcing ring; and 36, screws for correcting optical axis.

Figure 4:
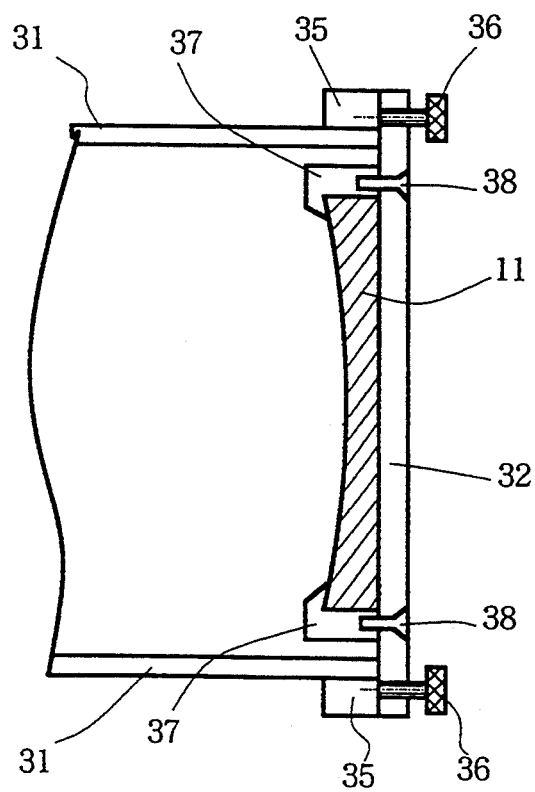
FIG. 4 is a sectional view showing a state wherein another concave mirror is mounted as a main mirror of a reflecting telescope.

FIG. 4 is a sectional view showing a state in which another concave mirror 11 is mounted as a main mirror of a reflecting telescope. The same reference numerals as in FIG. 3 denote the same parts in FIG. 4, and a detailed description thereof will be omitted. Although the rear surface of the concave mirror 1 in FIG. 3 is a convex surface (i.e., a surface conforming to the front concave surface), the rear surface of the concave mirror 11 in FIG. 4 is a flat surface. This flat surface can be obtained by a flat mold which is pressed against the rear surface during molding. Several peripheral portions of the concave mirror 11 are locked by CFRP mounting members 37 which are fixed on the main mirror cell 32 by screws 38, thereby mounting the concave mirror 11 on the main mirror cell 32.

In the concave mirrors in FIGS. 3 and 4, the main mirror cells 32, the mounting members 33, and the mounting members 37 are made of CFRP, but may be made of another material such as a metal or a plastics. However, if CFRP is used, a lightweight reflecting telescope having high precision can be obtained.

Figure 5:
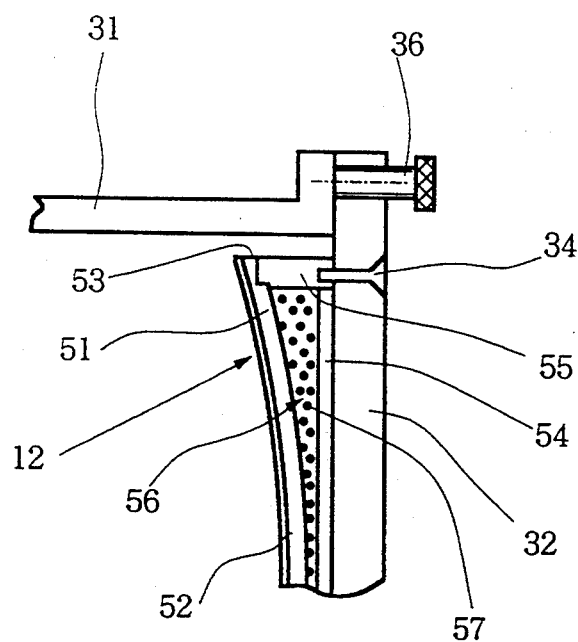
FIG. 5 is a sectional view showing a state wherein still another concave mirror is mounted as a main mirror of a reflecting telescope.

FIG. 5 is a sectional view showing a state in which still another concave mirror 12 is mounted as a main mirror of a reflecting telescope. The same reference numerals as in FIG. 3 denote the same parts in FIG. 5, and a detailed description thereof will be omitted. The concave mirror 12 in FIG. 5 comprises a main mirror (the same as the reflecting mirror in FIG. 1) 53 having a CFRP-made first substrate 51 and a reflecting layer 52 formed on the front surface of the first substrate 51, a second substrate 54 formed in rear of the first substrate 51, and an edge member 55 formed at edges of the main mirror 53 and the second substrate 54. The aperture of the main mirror 53 is almost equal to that of the second substrate 54. The edge member 55 is an annular member having almost the same aperture as that of the main mirror 53 or the second substrate 54. The main mirror 53, the second substrate 54, and the edge member 55 together define a space 56 between the concave mirror 12 and the second substrate. A foamed body 57 excellent in heat-insulating properties is filled in the space 56.

Since the foamed body 57 having a heat-insulating effect is filled in the space 56 in the rear of the concave mirror 12 in FIG. 5, the concave mirror has a low heat conductivity between the front and rear surfaces thereof. Thus, a variation in external temperature rarely adversely affects the concave mirror 12 from the rear surface to the front surface. Convection of air inside the mirror barrel by variation in external temperature does not occur, and therefore, light incident on the telescope is not disturbed. The concave mirror 32 in FIG. 5 can be manufactured as follows. After the main mirror 53 is manufactured, the main mirror 53, the second substrate 54 and the edge member 55 may be bonded to each as shown in FIG. 5, afterwhich the foamed body 57 is filled in the space 56 in rear of the concave mirror 12. However, the first substrate 51, the second substrate 54 and the edge member 55 may also be bonded to each other and then the foamed body 57 is filled in the space 56, afterwhich the reflecting layer 52 is formed on the front surface of the first substrate 51. Since the foamed body 57 is filled in rear of the concave mirror 12 in advance, rigidity sufficient to resist pressures during polishing can be assured.

Since the reflecting telescopes in FIGS. 3 to 5 use concave mirrors made mainly of CFRP, the overall weights of these telescopes are each very light. Therefore, when each reflecting telescope is to be mounted on an equatorial telescope, only a lightweight balancer is required, and the overall weight of the resulting product can be reduced to improve the portability thereof.

The above embodiment exemplifies a concave mirror off the present invention for use in a Newtonian reflecting telescope. The reflecting mirror of the present invention is also applicable to various optical machines. For example, the present invention is also applicable to concave and convex mirrors of Cassegrain reflecting telescopes. The present invention is further applicable to not only telescopes but also Schmidt cameras and the like.

Effect of the Invention

As has been described above, since according to the present invention, CFRP is used for the substrate of a reflecting mirror, there is provided a lightweight, inexpensive reflecting mirror having an almost zero thermal expansion coefficient. Strain of the reflecting mirror by its own weight can be minimized. When a telescope is constructed using such a reflecting mirror, there is provided a telescope which has a light overall weight, can minimize mechanical errors and is hardly affected by variations in external temperature.

What is claimed is:

1. A reflecting mirror comprising a substrate consisting of a carbon fiber reinforced plastics which is reinforced by carbon fibers which are derived from pitch and which have negative thermal expansion coefficient and a tensile modulus of at least 40 ton f/mm$^2$ and a reflecting layer formed on the front surface of said substate.

2. The mirror according to claim 1 wherein the substrate reinforced by the said carbon fibers has a linear expansion coefficient of about $0.3 \times 10^{-6}$.

3. A reflecting mirror consisting of a first substrate consisting of a carbon fiber-reinforced plastics which is reinforced by carbon fibers which are derived from pitch and which have a negative thermal expansion coefficient and a tensile modulus of at least 40 ton f/mm$^2$;

a reflecting layer formed on the front surface of said first substrate;

a second substrate formed on the rear surface of said first substrate;

an edge member formed at edges of said first and second substrates; and a foamed body filled in a space defined by said first and second substrates and said edge member.

4. A reflecting mirror according to claim 3, wherein said second substrate and said edge member consist of a carbon fiber-reinforced plastics.

5. The mirror according to claim 3 wherein the substrate reinforced by the said carbon fibers has a linear expansion coefficient of about $0.3 \times 10^{-6}$.

* * * * *